(12) United States Patent
Richardson et al.

(10) Patent No.: US 9,263,907 B2
(45) Date of Patent: Feb. 16, 2016

(54) METHOD AND APPARATUS FOR PROVIDING SUPPLEMENTAL POWER TO AN ENGINE

(71) Applicants: Francis D. Richardson, Eudora, KS (US); Richard L. Henderson, Leawood, KS (US); John A. Fox, Eudora, KS (US); Russell W. Sherwood, Olathe, KS (US)

(72) Inventors: Francis D. Richardson, Eudora, KS (US); Richard L. Henderson, Leawood, KS (US); John A. Fox, Eudora, KS (US); Russell W. Sherwood, Olathe, KS (US)

(73) Assignee: F.D. Richardson Enterprises, Inc., Eudora, KS (US)

(*) Notice: Subject to any disclaimer, the term of this patent is extended or adjusted under 35 U.S.C. 154(b) by 459 days.

(21) Appl. No.: 13/768,534

(22) Filed: Feb. 15, 2013

(65) Prior Publication Data
US 2013/0154543 A1    Jun. 20, 2013

Related U.S. Application Data

(63) Continuation-in-part of application No. 12/436,562, filed on May 6, 2009, now Pat. No. 8,493,021, which is a continuation-in-part of application No. 12/330,875, filed on Dec. 9, 2008, now abandoned.

(60) Provisional application No. 61/018,715, filed on Jan. 3, 2008.

(51) Int. Cl.
| | | |
|---|---|---|
| H02J 7/14 | (2006.01) | |
| H02J 7/00 | (2006.01) | |
| F02N 11/08 | (2006.01) | |
| F02N 11/10 | (2006.01) | |
| F02N 11/14 | (2006.01) | |
| H02J 1/10 | (2006.01) | |
| F02N 11/12 | (2006.01) | |

(52) U.S. Cl.
CPC ............ *H02J 7/007* (2013.01); *H02J 7/0034* (2013.01); *F02N 11/0866* (2013.01); *F02N 11/10* (2013.01); *F02N 11/12* (2013.01); *F02N 11/14* (2013.01); *H02J 1/10* (2013.01)

(58) Field of Classification Search
USPC ........................................ 320/105, 126, 104
See application file for complete search history.

(56) References Cited

U.S. PATENT DOCUMENTS

| | | | | |
|---|---|---|---|---|
| 5,083,076 | A * | 1/1992 | Scott ............................ | 320/105 |
| 5,459,391 | A * | 10/1995 | Amano ....................... | 320/152 |
| 6,417,668 | B1 * | 7/2002 | Howard et al. ............... | 324/426 |
| 6,545,445 | B1 * | 4/2003 | McDermott et al. .......... | 320/103 |
| 6,811,906 | B2 * | 11/2004 | Bai et al. ..................... | 429/431 |
| 6,819,083 | B1 * | 11/2004 | Patino et al. ................. | 320/134 |
| 2005/0269991 | A1 * | 12/2005 | Mitsui et al. ................. | 320/132 |

* cited by examiner

*Primary Examiner* — Robert Grant
(74) *Attorney, Agent, or Firm* — Erickson Kernell Derusseau & Kleypas, LLC

(57) ABSTRACT

A method and apparatus provides supplemental power to an engine. The method and apparatus includes a pair of conductive leads for connecting the supplemental power to an engine electrical system, one or more batteries connected in parallel with one or more capacitors, a relay connected to the conductive leads, a shunt cable connecting the batteries and capacitors to the relay and a processor for controlling the relay to selectively apply electrical power to the engine electrical system. The method and apparatus includes safety features to reduce the risk of injury to the operator and damage to the apparatus and/or engine electrical system.

25 Claims, 12 Drawing Sheets

METHOD AND APPARATUS FOR PROVIDING SUPPLEMENTAL POWER TO AN ENGINE

CROSS REFERENCE TO RELATED APPLICATIONS

This application is a continuation-in-part of application Ser. No. 12/436,562, filed May 6, 2009, entitled METHOD AND APPARATUS FOR PROVIDING SUPPLEMENTAL POWER TO AN ENGINE, which is a continuation-in-part of application Ser. No. 12/330,875, filed Dec. 9, 2008, entitled METHOD AND APPARATUS FOR PROVIDING SUPPLEMENTAL POWER TO AN ENGINE, which claims the benefit of provisional patent application 61/018,715, filed Jan. 3, 2008. with the same title.

FIELD

The present invention relates to a portable power source for a motor vehicle and, more particularly, to a method and apparatus to provide supplemental power to start internal combustion and turbine engines.

BACKGROUND

Internal combustion and turbine engines require a power source to start. Commonly, this power source is in the form of a battery, which provides power to a starter motor, which in turn drives the engine. The crankshaft of the engine is rotated by the starter motor at a speed sufficient to start the engine. If the battery goes dead or otherwise lacks sufficient power for the starter motor to drive the engine, the engine won't start. Environmental factors, such as temperature, affect the output of the battery and power required to rotate the engine.

If the battery lacks sufficient power to start the engine, a supplemental power source is necessary to jump start the engine. Typically, jumper cables are used to connect the battery of one vehicle to the dead battery of another vehicle needing to be jumped. The batteries are connected in parallel using heavy cables (jumper cables) which are connected to the terminals of the batteries using conductive clamps.

Several potential problems arise from the use of conventional jumper cables. Batteries in motor vehicles are capable of producing from 2,500 to more than 45,000 watts of power. If the batteries are cross-connected or the clamps inadvertently contact each other when one end of the jumper cables is connected to a battery, sparking can occur resulting in damage to the battery, the electrical system of the vehicle, and injury to the user of the jumper cables. If the jumper cables are not properly connected, there is a potential for the batteries exploding and fire, which may result in injury to those in proximity to the vehicle being jumped. Furthermore, the user is not given any indication as to the reason the battery is dead, which may only cause additional problems when trying to jump start the dead battery.

SUMMARY

The present invention provides an apparatus and method for temporarily delivering supplemental power to the electrical system of a vehicle. The apparatus and method performs real-time monitoring of all system parameters to increase the safety and effectiveness of the unit's operation while providing additional parametric and diagnostic information obtained before, during and after the vehicle starting operation.

The present invention monitors the voltage of the battery of the vehicle to be jump started and the current delivered by the jump starter batteries and capacitors to determine if a proper connection has been established and to provide fault monitoring. For safety purposes, only if the proper polarity is detected can the system operate. The voltage is monitored to determine open circuit, disconnected conductive clamps, shunt cable fault, and solenoid fault conditions. The current through the shunt cable is monitored to determine if there is a battery explosion risk, and for excessive current conditions presenting an overheating condition, which may result in fire. The system includes one or more internal batteries and capacitors to provide the power to the battery of the vehicle to be jump started. Once the vehicle is started, the vehicle's electrical system may recharge the batteries and capacitors before the unit automatically electrically disconnects from the vehicle's battery.

DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials as suitable or preferred for a given purpose in connection with the invention implies that mixtures or combinations of any two or more members of the group or class may be equally suitable or preferred.

Figure 1:
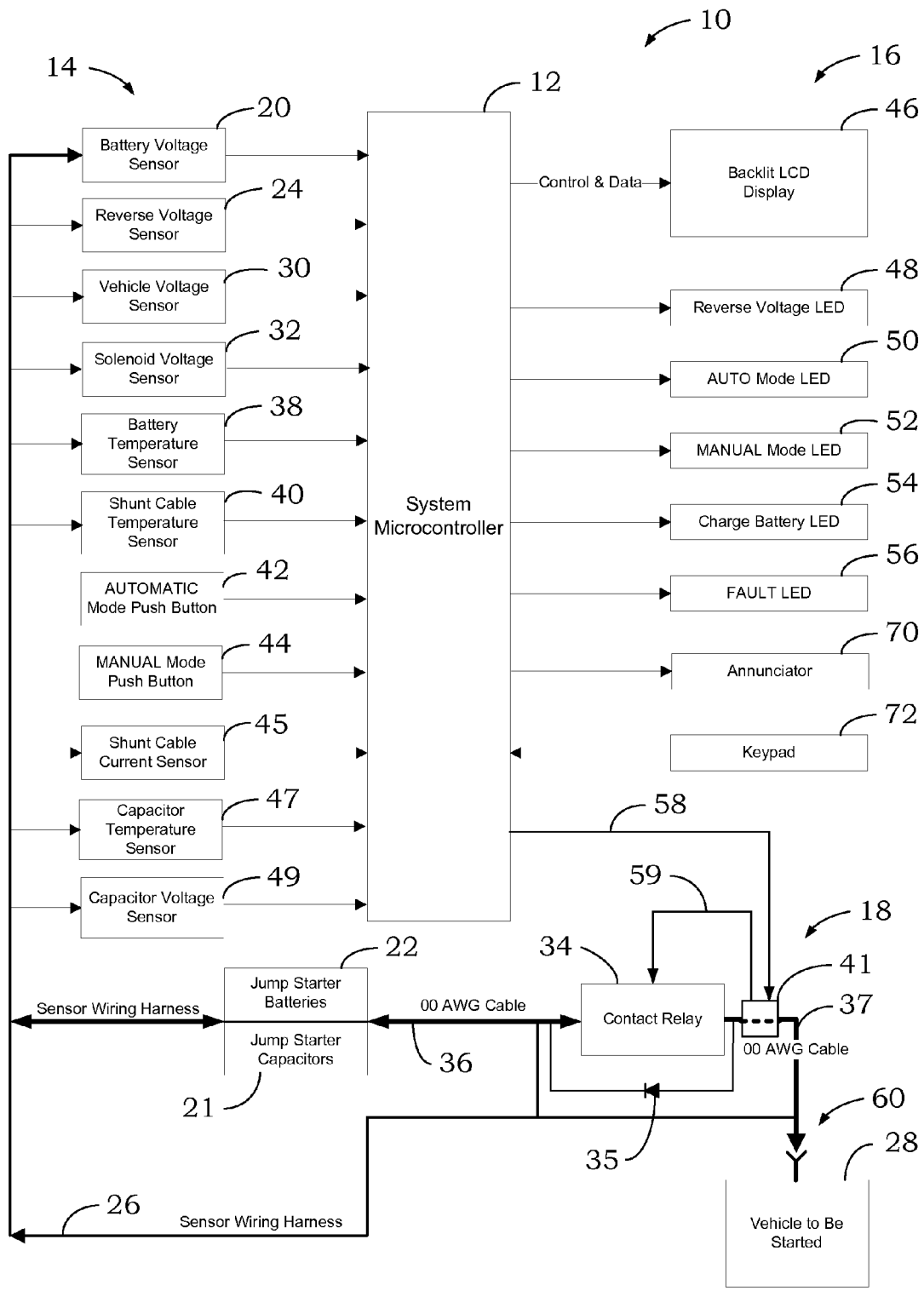
FIG. 1 is a functional block diagram of the portable power source of the present invention.
Figure 2A:
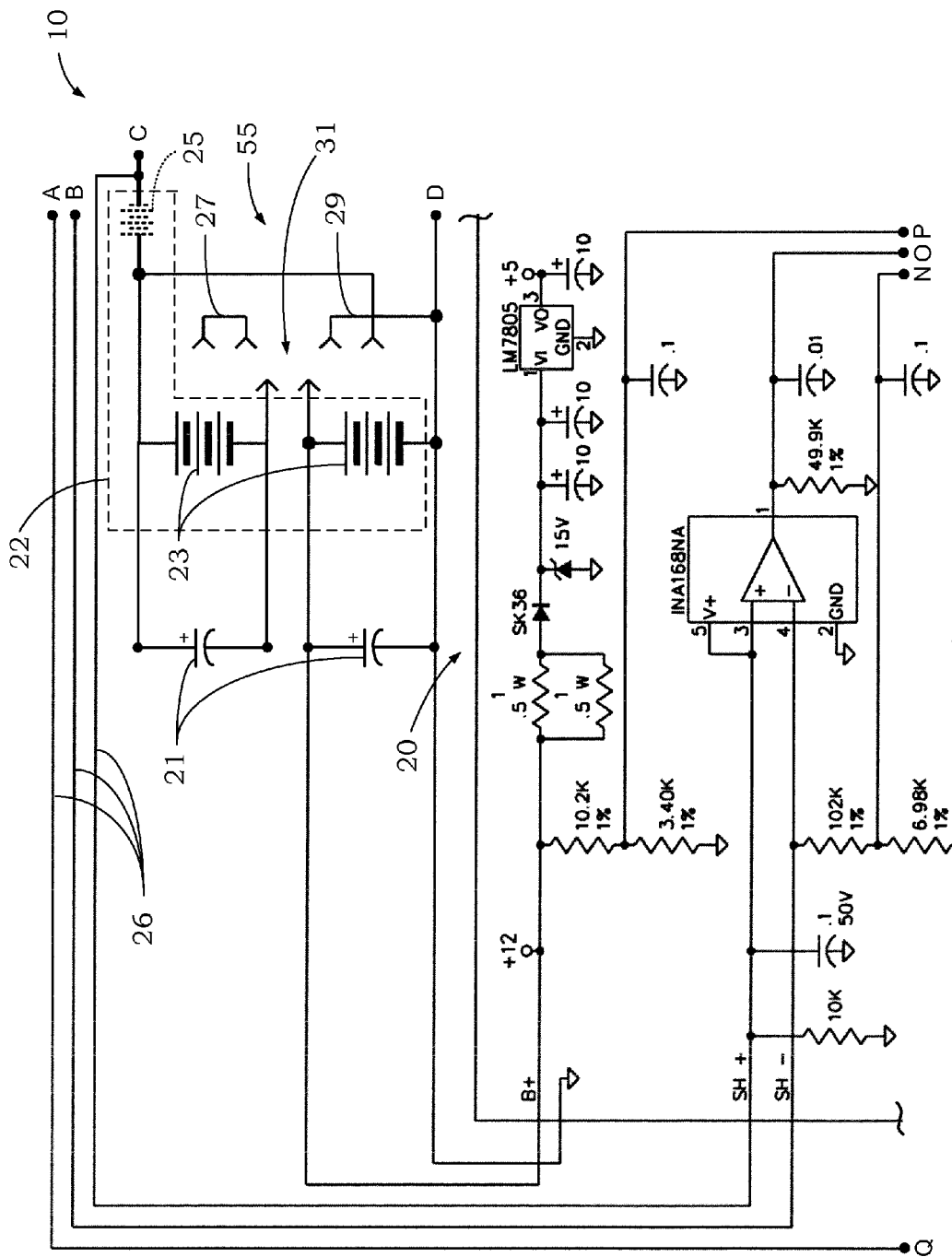
FIG. 2 (divided into FIGS. 2A, 2B, 2C and 2D) is a schematic of the portable power source, control circuit and sensors of the present invention.
Figure 2B:
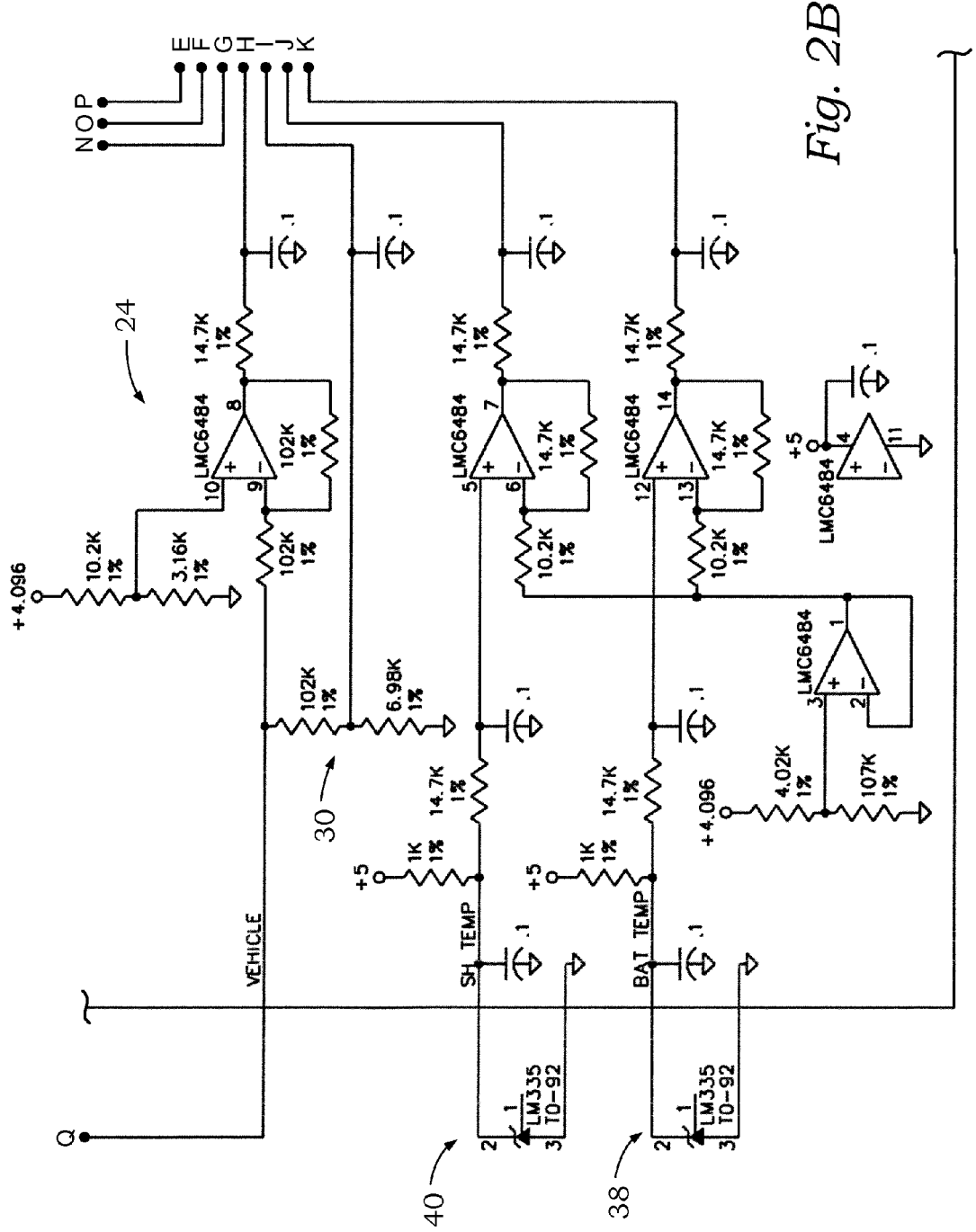
Figure 2C:
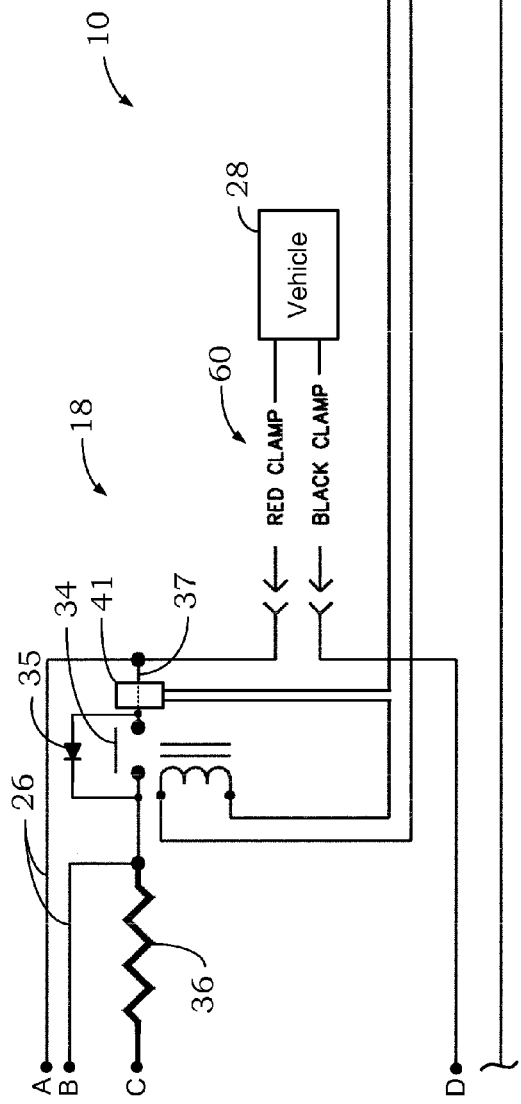
Figure 2D:
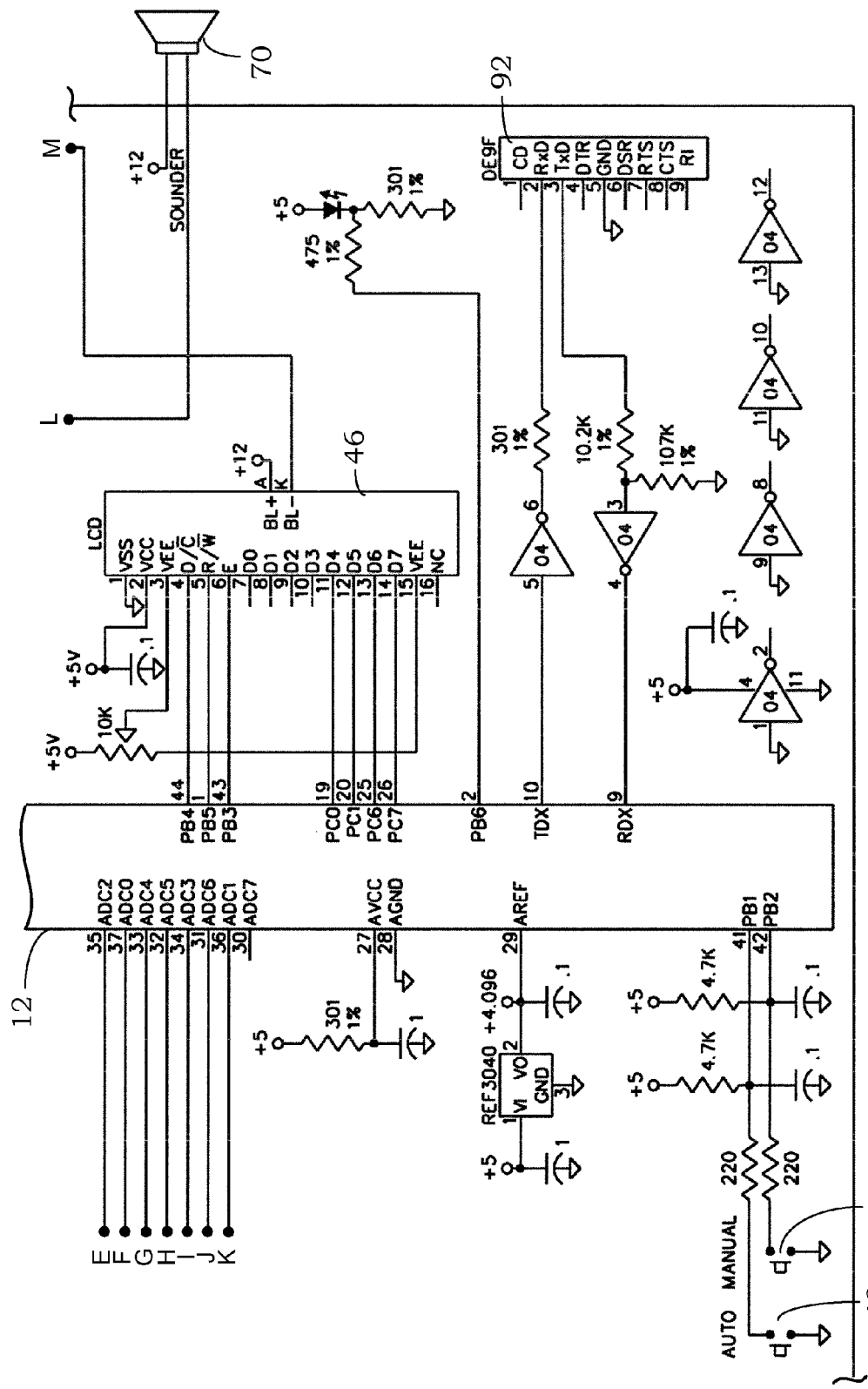
Figure 3:
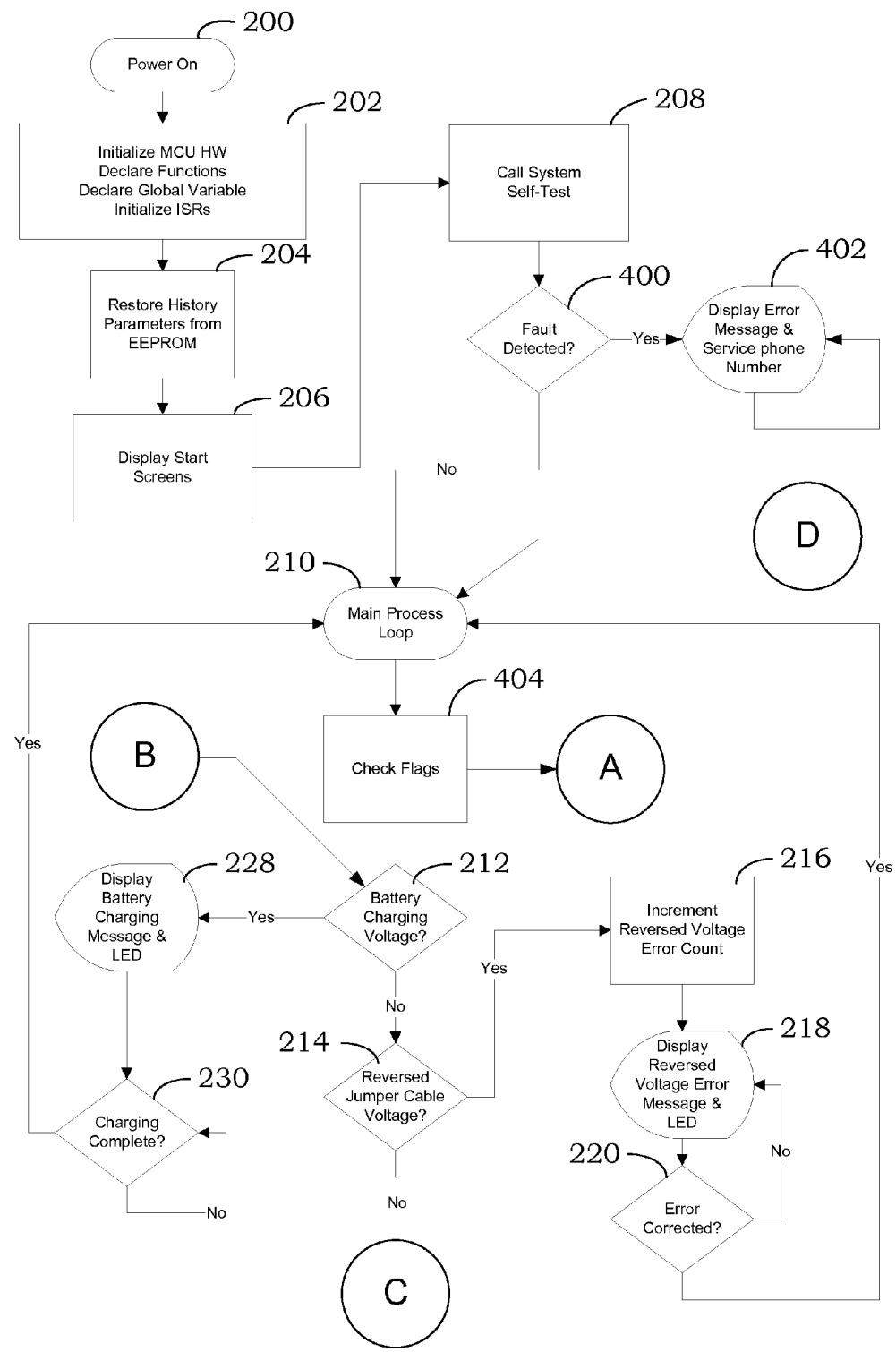
FIGS. 3-8 are flow charts of the processing steps of the portable power source of the present invention.
Figure 4:
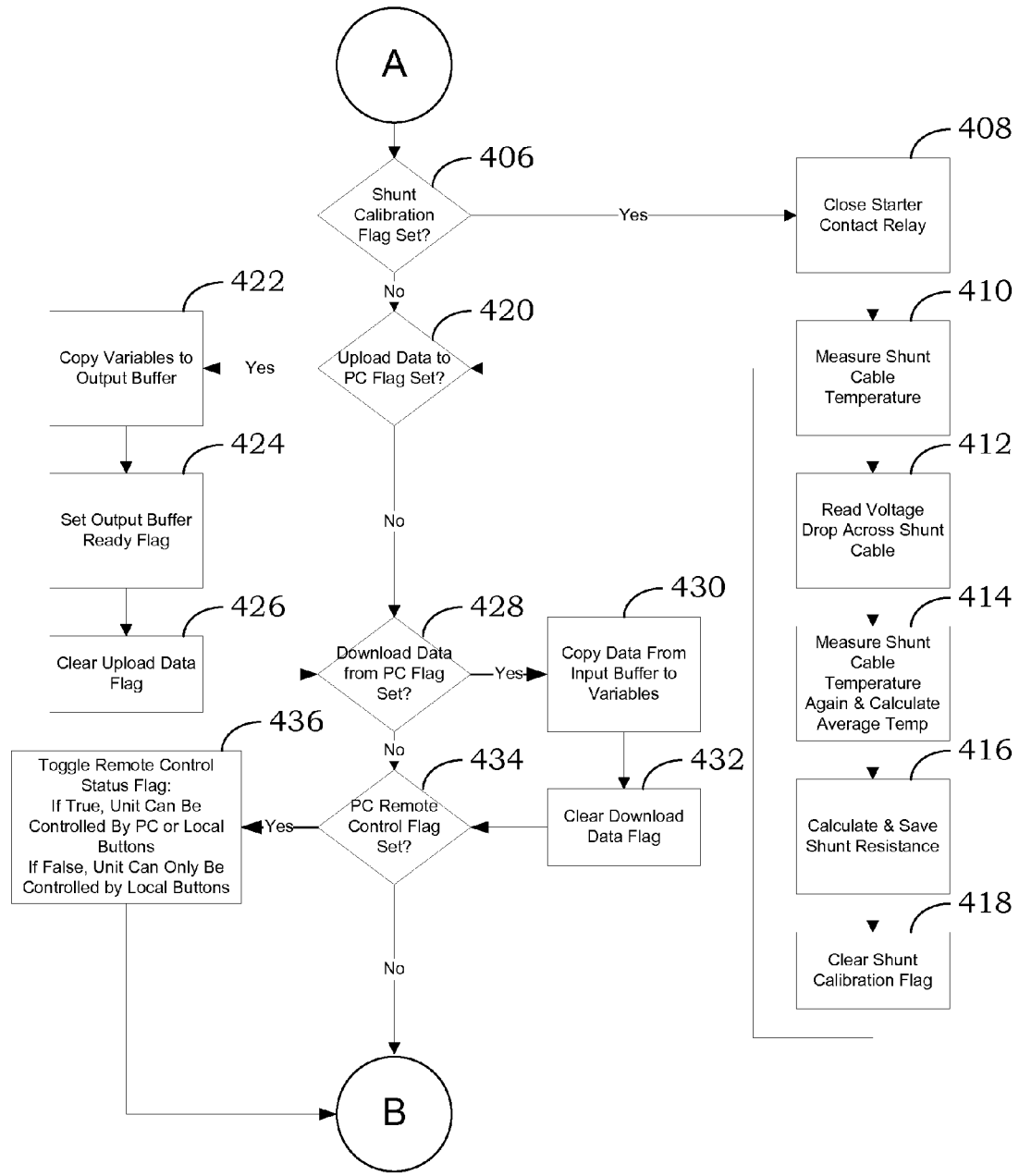
Figure 5:
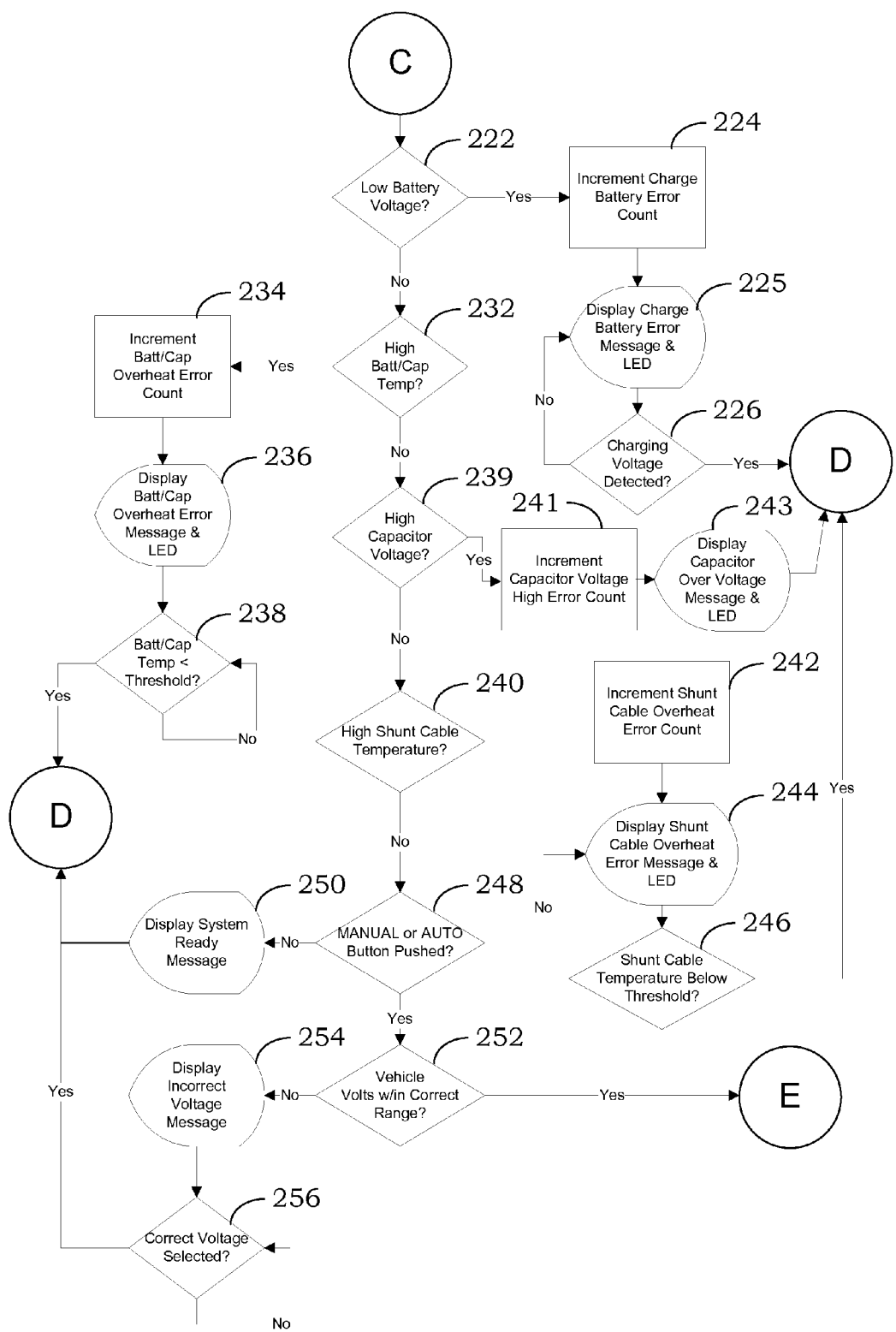
Figure 6:
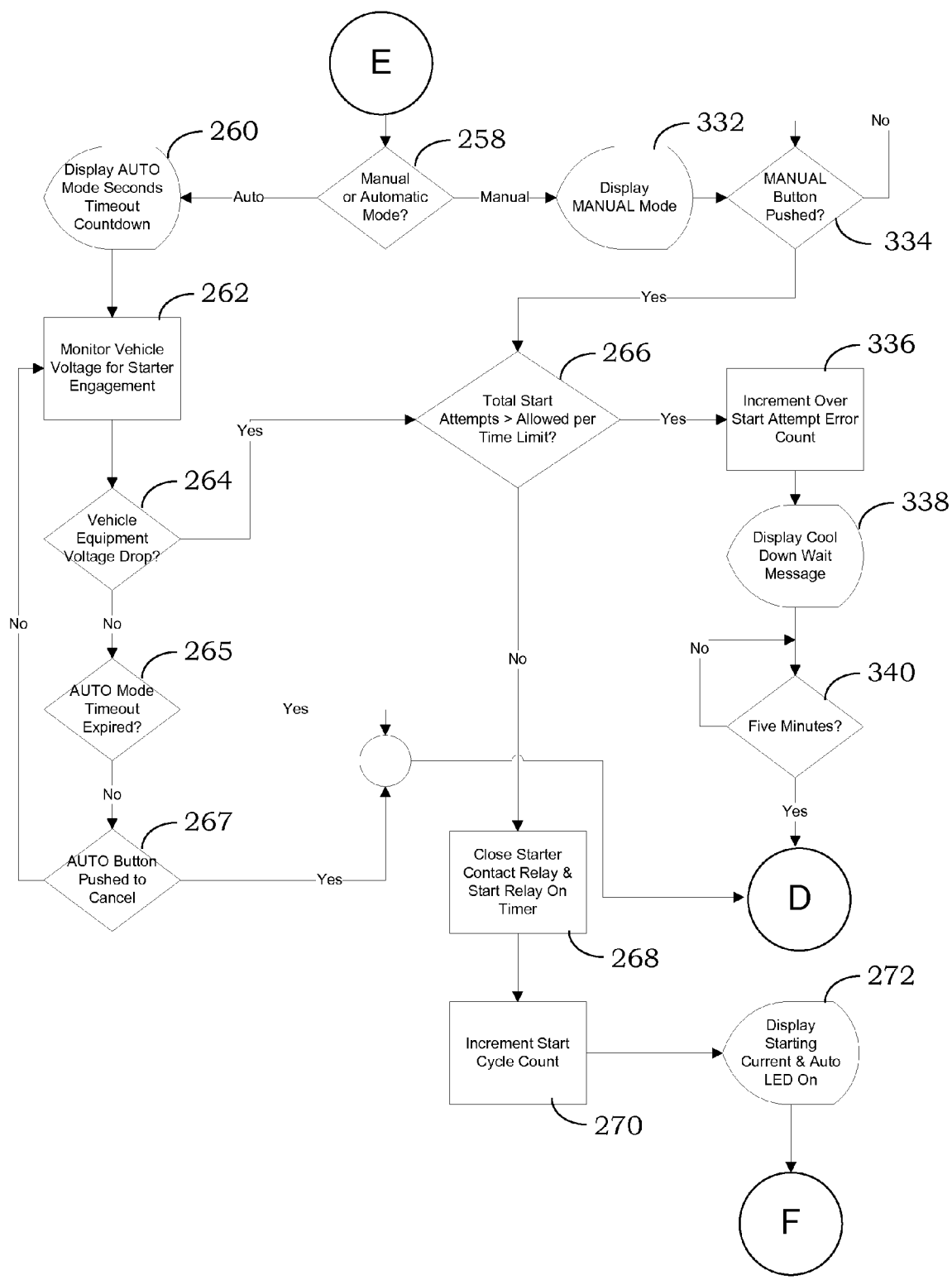
Figure 7:
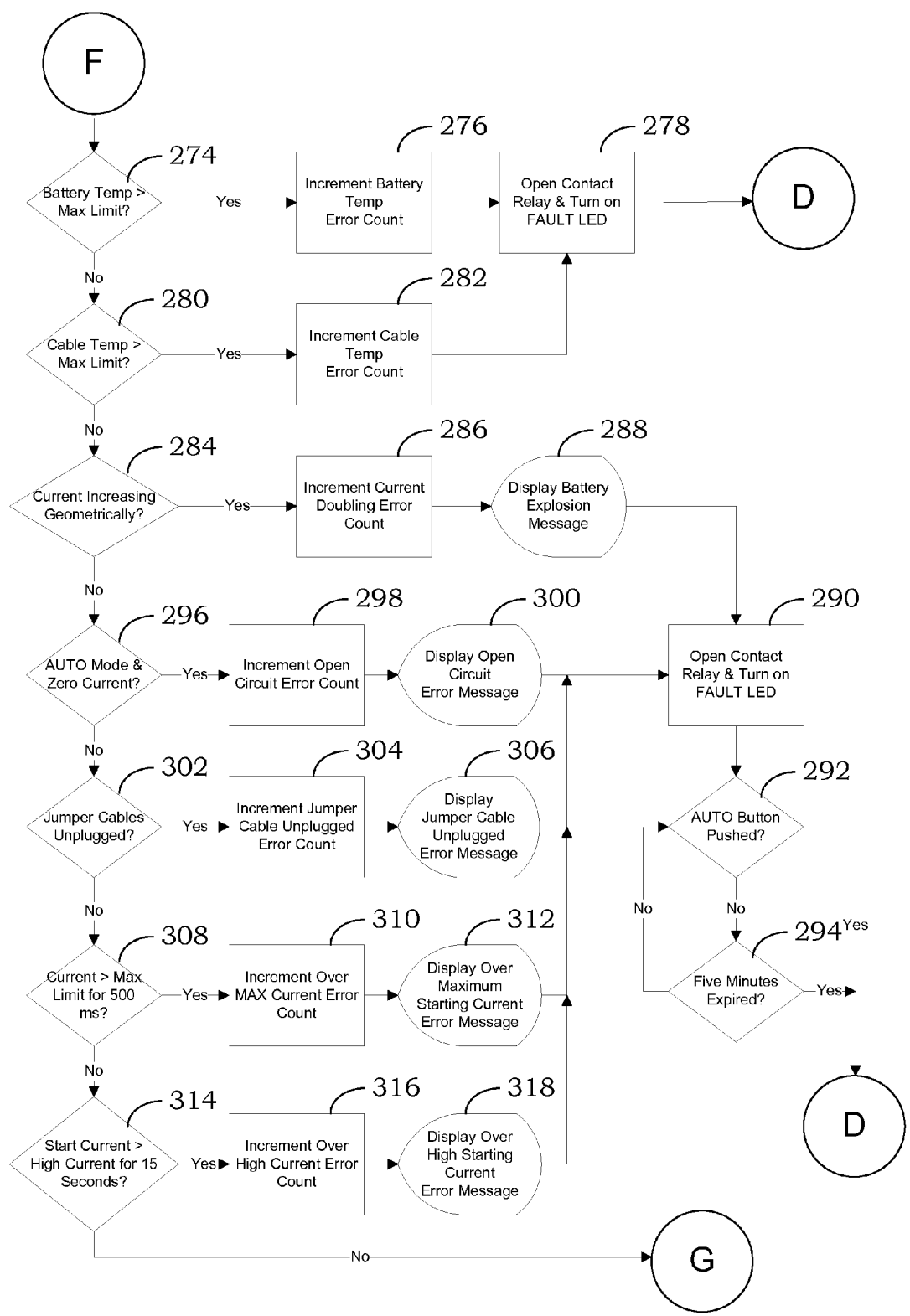

Referring initially to FIG. 1, the portable supplemental power source (jump starter) of the present invention is generally indicated by reference numeral 10. Jump starter 10 includes a programmable microprocessor 12 which receives inputs 14 and produces informational outputs 16 and control outputs 18. Microprocessor 12 provides flexibility to the system 10 to allow updates to the functionality and system parameters without changing the hardware. In the preferred embodiment, an 8-bit microprocessor with 64 k bytes of programmable flash memory is used to control the system 10. One such microprocessor is the ATmega644P available from Atmel Corporation. The microprocessor 12 may be programmed via an internal connector 90, or an external connector 92 (see FIG. 2). It should be understood that other programming ports may be included are not limited to the two shown in the figure.

A capacitor voltage sensor 49 monitors the voltage level of one or more capacitor 21. The capacitors 21 may include energy storage modules containing six or more ultracapacitor cells, for example. The capacitor modules 21 may be connected in series to obtain higher operating voltages or in parallel to provide additional energy storage. One such capacitor module is the Boostcap Energy Storage Module available from Maxwell Technologies, Inc.

A battery voltage sensor 20 monitors the voltage level of one or more jump starter batteries 22. A reverse voltage sensor 24 monitors the polarity of the jumper cables on line 26 which are connected to the vehicle's electrical system 28. A vehicle voltage sensor 30 monitors the voltage on line 37 (voltage of the vehicle). When the contacts are open, the solenoid voltage sensor 32 input to microprocessor 12 is used to measure the voltage of the jump starter capacitors 21 and batteries 22, which may be configured for various jump starter voltages. When the contacts are closed, the voltage difference between the capacitors 21 and batteries 22, and the contact relay 34 is used to measure the voltage drop across a temperature-and-resistance calibrated 00 AWG shunt cable 36 in order to calculate the current being delivered by the jump starter capacitors 21 and batteries 22 to the vehicle's electrical system 28. Although the present invention is disclosed and described as temporarily connected to a vehicle, it should be understood that it is equally applicable to a stationary engine. Additionally, the connection method to the electrical system or batteries of the engine to be started is not important and may include conductive clamps, NATO connectors, or may be permanently hardwired to the system, for example.

A battery temperature sensor 38 monitors the temperature of the jump starter's batteries 22 to detect overheating due to excess current draw from the batteries during jump starting. A shunt cable temperature sensor 40 monitors the temperature of the 00 AWG shunt cable 36 in order to compensate for resistance changes of the shunt cable due to the high current passing through the shunt cable 36 and to detect overheating conditions. The unit 10 also includes automatic 42 and manual 44 pushbutton inputs to accept user input to select either automatic or manual operation.

The temperature of 00 AWG shunt cable 37 may also be monitored by a temperature sensor or thermal switch 41. As long as the temperature of the cable 37 is below a predetermined limit, the input on line 58 is passed through sensor 41 to line 59 to enable the contact relay 34 as controlled by system microcontroller 12. If the temperature of the cable 37 exceeds a predetermined limit, then the temperature sensor 41 presents an open circuit to control line 58 to disable contact relay 34 and not allow power to be applied to the vehicle 28. It should be understood that the temperature sensor 41 may be coupled to cable 36, 37 or any other cable that may become overheated. Additional temperature sensors may be used to provide additional protection of the system from overheating.

A capacitor temperature sensor 47 monitors the temperature of the jump starter capacitors 21 to detect overheating due to excess current draw from the capacitors during jump starting.

The microprocessor 12 includes several outputs 16 to provide information to the user and to control the application of power to the vehicle to be jump started. An LCD display 46 may be used to display user instructions, error messages, and real-time sensor data during operation of the jump starter 10. A reverse voltage LED 48 is illuminated when the microprocessor 12 determines that a reverse voltage jumper cable voltage is detected by reverse voltage sensor 24. An auto mode LED 50 is illuminated when the automatic mode pushbutton 42 is depressed. A manual mode LED 52 is illuminated when the manual mode pushbutton 44 is depressed. If the voltage level of the jump starter batteries 22 drop below a value of twenty percent of the normal level, a charge battery LED 54 is illuminated. The charge battery LED 54 remains illuminated until the batteries 22 are charged to a minimum state of charge such as fifty percent, for example. A fault LED 56 is turned on anytime the microprocessor 12 detects any operational, sensor or internal fault. An audible warning may also be provided 70. The fault LED 56 remains illuminated until the fault condition is cleared.

A contact relay control output 58 operates the contact relay 34 through temperature sensor 41. When the jump starter operation has been successfully initiated, the contact relay 34 is closed and the jump starter capacitors 21 and batteries 22 are connected to the starter system or batteries of the vehicle to be started 28. The contact relay 34 is opened when a successful start cycle has been completed, a start fault has occurred or the operator interrupts the jump starter cycle. An optional key pad 72 may be included and used for entry of a passcode to operate the unit 10, or to identify one or more users of the system which may be stored to track user operation. For example, if two different users operate the unit 10 and error conditions are recorded for one of the users, this information may be used to identify training issues that need to be addressed.

Figure 8:
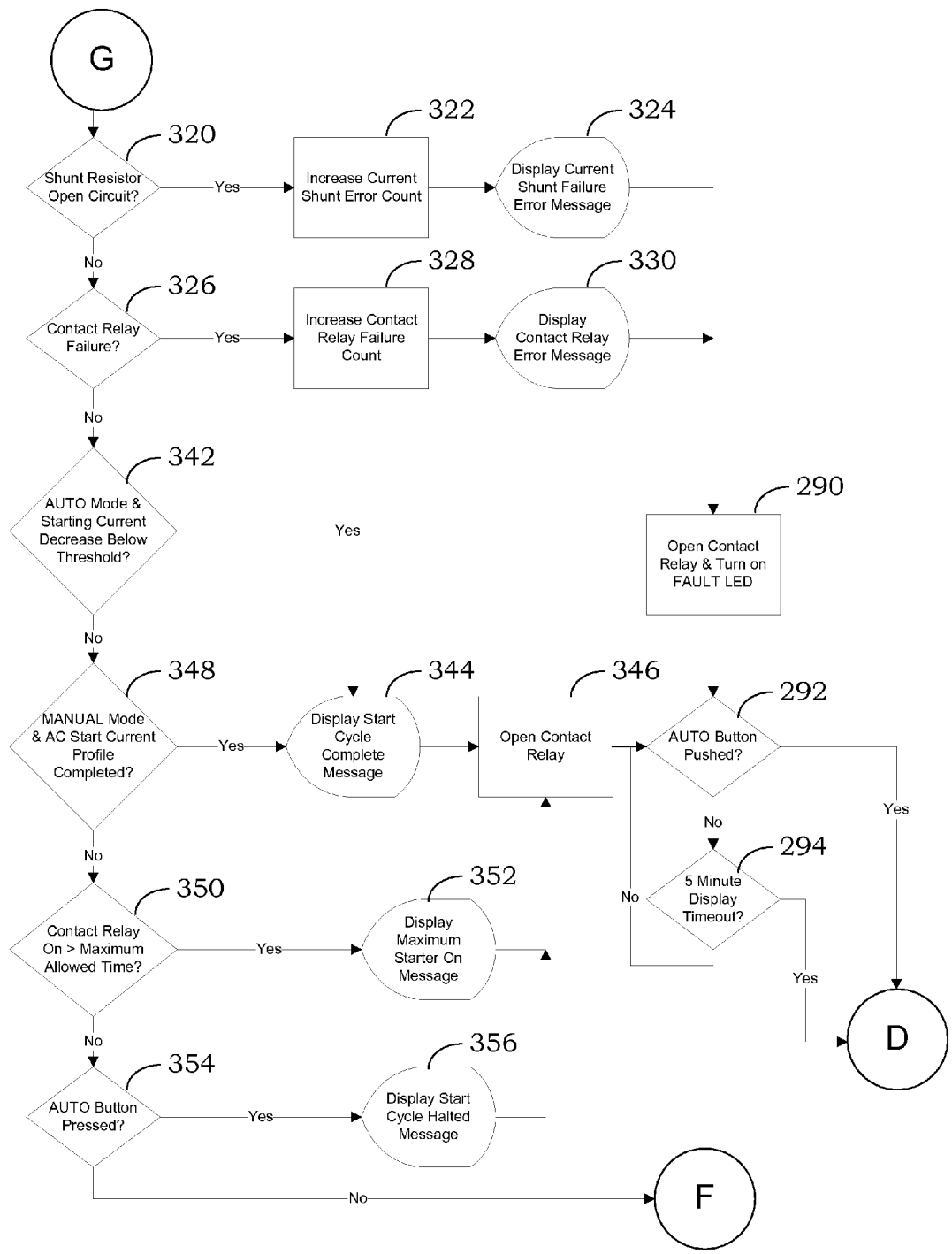

Referring to FIGS. 2A, 2B, 2C, 2D and 3-8, when the jump starter 10 is initially powered on 200, the microcontroller 12 initializes the hardware, reads all system parameters and variables, and initializes the interrupt service routine 202 (See FIG. 8). All stored performance history is read from the onboard, non-volatile memory 204 and a start message is displayed 206 on the LCD display 46. The history is saved for diagnostic, unit use and safety purposes. The microcontroller 12 then performs a system self-test operation 208 where the LCD 46, all LEDs 48, 50, 52, 54 and 56, all sensors 20, 24, 30, 32, 38, 40, the push buttons 42 and 44, and the system batteries 22 are tested and their status displayed 208 on the LCD 46. If a fault is detected 400, an error message is displayed 402 and system operation is halted.

Figure 9:
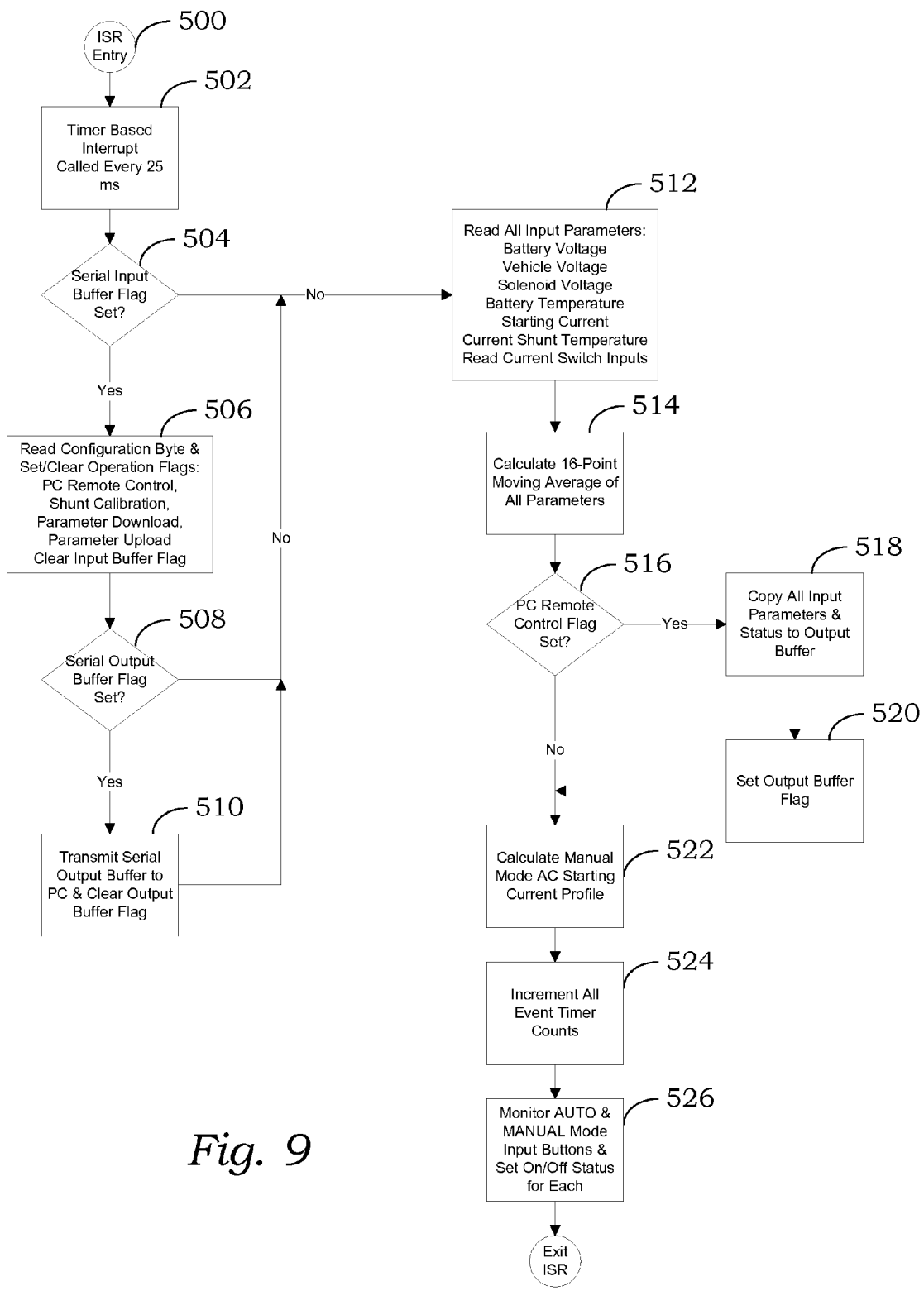
FIG. 9 is a flow chart of the interrupt service routine of the system of the portable power source of the present invention.

Once the initialization and self-test operations are completed, the system starts into a main processing loop 210. An interrupt service routine ("ISR") 500 (FIG. 9) is also started which constantly monitors all input sensor values and user input buttons. The ISR 500 is periodically called by the microcontroller 502. A check is made to determine if the serial input buffer flag is set 504. If the flag is set 504, then configuration information is read and flags set or cleared 506. If the output flag is set 508, the information is transmitted to an external PC and the output buffer flag is cleared 510. Next, all input parameters are read 512, and a moving average is calculated for each parameter 514. If the PC remote flag is set 516, all parameters and statuses are copied to the output buffer 518 and the output buffer flag is set 520. The manual mode AC starting current profile is calculated 522, all event timer counts are incremented 524, and the status of the automatic 42 and manual 44 pushbuttons is monitored and set 526. All calculations, timer counts, and status indications (flags) are stored in the internal memory of the microprocessor 12.

At the start of the main process loop 210, the flags are checked 404 beginning with the shunt calibration flag 406. If the shunt calibration flag is set 406, the starter contact relay 34 is closed 408. The temperature of the shunt cable is measured 410 and the voltage drop across the shunt cable is read 412. The temperature of the shunt cable is measured a second time and averaged with the previous reading 414. The shunt resistance is then calculated and saved 416 and the shunt calibration flag is cleared 418.

Next, if the flag to upload data to an external PC is set 420, the information is copied to the output buffer 422, the output buffer ready flag is set 424, and the upload data flag is cleared 426. If the download data from PC flag is set 428, data is copied from the input buffer 430, and the download data flag is cleared 432.

If the PC remote control flag is set 434, the remote control status flag is toggled 436. If the flag is true, the unit 10 can be controlled remotely by a PC or locally by the buttons. If the flag is false, the unit can only be controlled locally.

If the system does not detect a battery charging voltage 212, once jumper cables 60 have been manually connected to the vehicle to be started 28, the voltage is measured by the reverse voltage sensor 24 to determine if the cables have been properly connected to the vehicle 214. If the voltage measured is significantly less than the voltage of the jump starter capacitors 21 and batteries 22, then a reverse polarity connection of the jumper cables to the vehicle is determined and an error flag is set and the event saved in non-volatile memory 216. A "Reverse Polarity" error message is displayed 218 on the LCD 46, and the reverse voltage LED 48 is illuminated 216. Any further jump starter action by the operator is ignored until the reverse polarity condition is corrected 220, at which point processing returns to the start of the main processing loop 210.

If the jumper cables 60 are not reverse connected 214, then the state of charge of the capacitors 21 and batteries 22 is determined 222. If the voltage level of the system batteries 22 measured by the voltage sensor 30 is equal to a state of charge of eighty percent or more below a fully charged voltage level 222, an error flag is set and the event recorded in memory 224. The charge battery LED 54 is illuminated and the LCD 46 displays a "Charge Battery" message 225. The system stays in this condition, which prohibits any further jump starter action by the operator until a charging voltage is detected 226, which is great enough to indicate that a battery charger (not shown) has been connected to the batteries 22.

If the system has detected a battery charger voltage 212, a "Battery Charging" message is displayed 228 on the LCD 46, and the charge LED 54 is illuminated. The voltage profile of the battery 22 is monitored to determine if the charge is complete 230. A completed charge is determined by monitoring the charging voltage rise to a threshold value then decrease by a predetermined percentage. This voltage peaking and subsequent fall-off is a characteristic of the battery chemistry indicating that the battery has reached its maximum charge capacity. Once the charging has reached a minimum charged level or is completed 230, the processing returns to the beginning of the main processing loop 210. The jump starter batteries 22 only need to reach a 50% charge in order for the system to attempt to start the vehicle.

If the battery or capacitor temperature measured by sensors 38 and 47 rises above a maximum safe threshold 232, an error flag is set and the event recorded in non-volatile memory 234. An error message "Battery Over Temperature" or "Capacitor Over Temperature" is displayed 236 on the LCD 46 and the Fault LED 56 is illuminated. The system prevents any further operation until the battery and/or capacitor temperature falls below a safe level 238. Once a safe temperature is reached, processing returns to a ready state at the beginning of the main processing loop 210.

If the voltage of one or more of the capacitors measured by the capacitor voltage sensor 49 exceeds a predetermined limit 239, such as 2.8 volts, for example, an error flag is set and the event recorded in non-volatile memory 241. An error message "Capacitor Over Voltage" is displayed 243 and the fault LED 56 is illuminated. Processing then returns to the main processing loop 210.

If the temperature of the shunt cable 36 rises above a safe threshold temperature 240, an error flag is set and the event recorded in memory 242. An error message "Cable over Temperature" is displayed 244 on the LCD 46 and the Fault LED 56 is illuminated. The system prevents any further operation until the shunt cable temperature falls below a minimum safe temperature 246. Once a safe temperature is reached, the system returns to a ready state at the beginning of the main processing loop 210.

Next, the system checks the status of the automatic 42 and manual 44 push buttons. If neither button has been pushed 248, a "Ready" message is displayed 250 on the LCD 46 and processing returns to the main processing loop 210. When no error conditions are detected and no user inputs are being processed, the system remains in the ready mode, and displays a "Ready" text message on the LCD 46. Other information such as the selected jump starter voltage, the percentage change of the batteries 22, the temperature of the batteries, and the vehicle voltage, for example, may also be displayed on LCD 46.

If one of the push buttons 42 or 44 has been selected, the system will compare the operator-configured starter voltage against the voltage of the vehicle to be started 28. The jump starter 10 may be configured for 12, 18, 24, 30, 36, 42 or 48 volts, for example, using a selector jumper 55. For example, if the batteries 23 are both 12-volt batteries, the system may be configured for 12- or 24-volt operation. For example, if jumper 27 is placed across terminals 31, the 24-volt configuration may be selected. If jumper 29 is placed across terminals 31, the 12-volt configuration may be selected. If the batteries 23 are 12-volt batteries and a battery 25 is a 6-volt battery, 18- or 30-volt configurations may be provided. For example, if jumper 27 is placed across terminals 31, the 30-volt configuration may be selected. If jumper 29 is placed across terminals 31, the 18-volt configuration may be selected. It should be understood that two or more batteries of the same or different voltage levels may be used to meet the voltage requirements of the vehicle to be started. If the difference between the voltage selected and the voltage measured is not within a predetermined range and tolerance 252, a "Wrong Selector Volts" message is displayed 254 on the LCD 46 and further operation is prohibited until the correct voltage is selected 256 at which point processing returns to the main processing loop 210.

If the selected voltage is within the correct range 252, then the system determines which button was selected 258. If the Auto button 42 was pushed, a ninety-second count down timer is started and displayed 260 on the LCD 46. During this time the system monitors the vehicle voltage 262. If the system does not detect a voltage drop 264 within 90 seconds 265, the automatic operation is cancelled and processing returns to the main processing loop 210. The automatic operation may also be interrupted and canceled by pushing the auto button 267. If the vehicle voltage drops by twenty percent or more from the initially measured voltage 264, then the vehicle's starter motor is engaged and is trying to start the vehicle. If the maximum number of start attempts has not been exceeded 266, the contact relay 34 is closed and the contact relay on timer is started 268, connecting the jump starter's capacitors 21 and batteries 22 to the vehicle's starting system 28. The start cycle counter is incremented 270, a "Jump Starter On" message is displayed 272 along with the average current being drawn, and the Auto Mode LED 50 is illuminated. If the relay on timer expires indicating that the relay 34 has been closed for ninety seconds without a start complete event, the relay 34 is automatically opened by the system to reduce the probability of overheating any component in the jump starter or vehicle.

The system monitors all input sensors 14 and the current status of the jump starter for possible fault conditions. Upon detection of any fault condition, the system will open the contact relay 34 (if closed), and display a message indicating that a fault has occurred, and what action, if any, should be taken by the operator.

If the battery temperature exceeds a maximum limit 274, a battery temperature error count is incremented 276. The contact relay 34 is opened, a "Battery Temp" error message and temperature is displayed 278 on the LCD 46 and the fault LED 56 is illuminated. Processing returns to the main processing loop 210.

If the shunt cable temperature exceeds a maximum limit 280, a cable temperature error count is incremented 282. The contact relay 34 is opened, a "Cable Temp" error message and temperature is displayed 278 on the LCD 46 and the fault LED 56 is illuminated. Processing returns to the main processing loop 210.

If the system detects a geometric rise in the starting current 284 during the first 16 seconds after the contact relay 34 is closed, a current doubling error count is incremented 286, a "Battery Explosion" error message is displayed 288 on the LCD 46, the contact relay 34 is opened and the fault LED 56 is illuminated 290. The system may be returned to the ready mode if the Automatic button 42 is pressed by the operator 292, or automatically after five minutes 294.

If no current flow is detected by the system 296 indicating that there is an open circuit within the system, an open circuit error count is incremented 298, an "Open Circuit" error message is displayed 300 on the LCD 46, the contact relay 34 is opened and the fault LED 56 is illuminated 290. The system may be returned to the ready mode if the Automatic button 42 is pressed by the operator 292, or automatically after five minutes 294.

If the system detects an increase in the difference between the measured jump starter battery voltage 20 and the voltage measured 30 across the contact relay 34 indicating that one of the jump starter cables has been disconnected 302 from the vehicle's battery or starter system 28 then a jumper cable unplugged error count is incremented 304, a "Jumper Cable Unplugged" error message is displayed 306 on the LCD 46, the contact relay 34 is opened and the fault LED 56 is illuminated 290. The system may be returned to the ready mode if the Automatic button 42 is pressed by the operator 292, or automatically after five minutes 294.

During the jump starting process if the current measured across the shunt cable 36 is greater than a preset maximum current such as 1400 amps for a short period of time such as 500 ms 308, the over max current error count is incremented 310, an "Over MAX Starting Current" error message is displayed 312 on LCD 46, the contact relay 34 is opened and the fault LED 56 is illuminated 290. The current across the shunt cable 36 is also measured to determine if it exceeds a predetermined current such as 1000 amps for more than a predetermined period of time such as 15 seconds 314. If this over current condition is determined, an over high current error count is incremented 316, an "Over High Crank Amps" error message is displayed 318 on the LCD 46, the contact relay 34 is opened and the fault LED 56 is illuminated 290. The system may be returned to the ready mode if the Automatic button 42 is pressed by the operator 292, or automatically after five minutes 294.

If the system detects a decrease in the jump starter battery voltage 20, but does not detect an appreciable current flow through the jump starter, a shunt cable 36 failure is indicated 320. The shunt cable 36 is a precisely measured and calibrated 00 AWG wire, the temperature of which is monitored 40 and used to calculate the resistance across the length of the cable 36.

The voltage drop across the cable 36 is also measured to calculate the current through the shunt cable 36 using Ohm's Law. If the shunt cable 36 fails, the system cannot reliably measure the starting current which would present a safety hazard.

If the system detects a shunt cable failure 320, a current shunt error count is incremented 322, a "Current Shunt Failure" error message is displayed 324 on the LCD 46, the contact relay 34 is opened and the fault LED 56 is illuminated 290. The system may be returned to the ready mode if the Automatic button 42 is pressed by the operator 292, or automatically after five minutes 294.

If the system detects a great difference between the vehicle's voltage 30 and the contact relay 34 voltage 326, the contact relay 34 may have failed indicating an over high starter current condition. A contact relay failure count is incremented 328, a "Contact Relay Error" message is displayed 330 on the LCD 46, the contact relay 34 is opened and the fault LED 56 is illuminated 290. The system may be returned to the ready mode if the Automatic button 42 is pressed by the operator 292, or automatically after five minutes 294.

If manual mode is selected 258, "Manual" is displayed 332 on the LCD 46, the system will prompt the operator to press the manual button 44 again. If the manual button 44 is pressed a second time 334, then the system checks the number of start attempts 266. If the maximum number of start attempts has been exceeded 266, an over start attempt error count is incremented 336, a "Cool Down Unit" message is displayed 338 on the LCD 46, and the system waits for five minutes for the system to cool 340. Once the cool down time has expired, processing returns to the main processing loop 210. If the total start attempts have not exceeded the limit 266, the processing continues at block 268 as described above.

If in auto mode and the starting current decreases by 20% from the maximum measured current 342, then the start cycle is complete. A decrease in the starting current indicates that the vehicle has started and its alternator is now generating its own current reducing the demand from the jump starter batteries 22. If the starting current is below the threshold 342, a "Start Cycle Complete" message is displayed 344 on LCD 46, and the contact relay is opened 346. This message remains displayed until the operator presses the Auto button 292, or if there is no user activity for five minutes 294, after which the system returns to the main processing loop 210.

If in manual mode, the jump starter 10 may be used when the battery voltage of the vehicle is below 10 volts, or if the vehicle's battery is not connected. In the situation where the vehicle's battery is present but has a voltage of less than 10 volts, the jump starter will start to charge the vehicle's battery before any starting operation begins. If the vehicle's battery is extremely low or completely dead, once the contactor is closed, the jump starter's batteries will start to charge the batteries. The current will rise sharply and then start to decrease, but this does not indicate that a start attempt has been made or that the vehicle's starter motor has been cranked. The algorithm looks for this initial increase and then decrease in the delivered current and then waits for a minimum of three alternating current cycles indicating that the vehicle's starter has been engaged. Due to the compression/decompression cycles of the pistons, the starting current will rise and fall in a generally sinusoidal pattern. The algorithm looks for this so that it knows that the vehicle's starter motor has been activated. Once this alternating current cycle has been detected, if the current then decreases by approximately twenty percent and remains low, this indicates a start complete, the contactor is opened, the start complete message is displayed and then the system waits for the Auto button to be pushed or the 5 minute timeout.

If the vehicle's battery holds the charge, then the starting cycle in manual mode is the same as described above for automatic mode. If the battery does not hold the charge or if no battery is present, the system waits until the vehicle's starter motor is engaged. Once the vehicle's starter motor is engaged and the engine is turning over, the system 10 monitors the jump starter current flow. As the engine turns over the jump starter's current increases and decreases with the compression stroke of the engine's pistons. During a piston's compression cycle, the current from the jump starter's batteries 22 increases due to the increased power demand of the starter motor. During a piston's decompression cycle, the current flow decreases due to the decreased power demand of the starter motor. This current increase and decrease is generally sinusoidal which is recognized by the system.

Once the system has detected three more sinusoidal current flow cycles, the same 20% decrease threshold in current as set forth above for the automatic mode determination, may be used to determine when the vehicle's engine has started 348. If the engine has started, the "Start Cycle Complete" message is displayed 344 on the LCD 46 and the contact relay opened 346.

If the engine has not been started 348, the system next checks the relay closed time. If the maximum time set for the contact relay to be closed has expired 350, a "Maximum Starter On" message is displayed 352 on the LCD 46 and the contact relay is opened 346.

If the contact relay closed time has not expired, the system checks for a cycle halt flag. Any cycle may be interrupted by the Auto button being pressed by the operator. If the Auto button is pressed 354, a "Start Cycle Halted" message is displayed 356 on the LCD 46, and the contact relay opened 346.

At the completion of a start cycle the jump starter 10 has opened the contact relay 34 and the message "Start complete" is displayed 46, and the starting current is displayed for diagnostic assessment of the vehicle's starting system. At this time the voltage of the vehicle 28 is monitored. Normal vehicle charging voltages fall within certain ranges for 12, 18, 24, 30, 36, 42 and 48 volts systems. The jump starter displays the running vehicle's voltage and makes an assessment to determine if the vehicle's generated voltage is actually great enough to charge the vehicle's battery. If the voltage is below a threshold for charging the vehicle's battery, the jump starter displays "Vehicle Not Charging" message and shows the measured voltage. If the vehicle's generated voltage is great enough to charge the vehicle's battery, the jump starter displays "Vehicle Charging" showing a working vehicle charging system and displays the vehicle charging voltage.

Referring to FIGS. 1 and 2, a diode 35 may be connected across the contact 34 to charge the capacitors 21 and jump starter batteries 22 from the vehicle charging system 28. The charging system of the vehicle may be used to charge the capacitors 21 and jump starter batteries 22. Whenever the vehicle has a working charging system this will occur as long as the cables are connected to the vehicle. This allows the capacitors 21 and jump starter batteries 22 to be fully recharged in about 1 to 5 minutes and can therefore start many vehicles in a row without becoming discharged. Even in situations in which the jump starter batteries 22 may be discharged to an extent that they alone may not be able to provide the necessary power to start a vehicle, the capacitors 21 may be rapidly recharged to start many vehicles in a row. This is very useful when starting fleets of vehicles with dead batteries.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A method for delivering supplemental power from a portable jump starter to an engine comprising the steps of:
    positioning said portable jump starter proximate the engine;
    temporarily manually connecting conductive leads from said portable jump starter to the electrical system of the engine;
    automatically selecting a voltage output of one or more system batteries housed in said portable jump starter and one or more system capacitors housed in said portable jump starter,
    verifying the polarity of the conductive leads;
    providing an alert if said polarity is incorrect;
    assessing the voltage level of said electrical system;
    applying power from said system batteries and said system capacitors to said electrical system;
    monitoring the current output of said system batteries and said system capacitors;
    measuring one or more voltage levels to determine one or more fault conditions;
    examining the current through a shunt cable; and
    electrically disconnecting said conductive leads from said electrical system when the engine starts.

2. The method of claim 1 including determining the temperature of said shunt cable.

3. The method of claim 2 wherein if said temperature reaches a predetermined limit, electrically disconnecting said conductive leads from said electrical system.

4. The method of claim 2 including calculating the resistance of said shunt cable.

5. The method of claim 4 including calibrating said shunt cable.

6. The method of claim 1 wherein said selecting step includes selecting a voltage from the group consisting of 12 volts, 18 volts, 24 volts, 30 volts, 36 volts, 42 volts and 48 volts.

7. The method of claim 6 wherein said voltage is 18 volts or 30 volts.

8. The method of claim 1 wherein said verifying step includes comparing the voltage level of said electrical system to the voltage level of said supplemental battery.

9. The method of claim 1 wherein said assessing step includes charging an engine battery connected to said electrical system if the voltage of said engine battery is below a predetermined level.

10. The method of claim 9 including the step of monitoring a charging voltage of said system batteries and said capacitors.

11. The method of claim 10 wherein when said charging voltage rises to a threshold value and then decreases by a predetermined percentage, charging of said engine battery is complete.

12. The method of claim 1 wherein said assessing step includes comparing the voltage level of said electrical system to a supplement power voltage setting, whereas if the difference between said electrical system voltage and said supplement power voltage setting is greater than a predetermined limit, indicating a fault condition.

13. The method of claim 1 wherein said applying step includes closing a relay.

14. The method of claim 1 wherein said applying step includes recording operational data.

15. The method of claim 1 wherein said applying step includes recording the number of start attempts.

16. The method of claim 13 wherein said applying step includes starting a timer.

17. The method of claim 16 wherein said applying step includes opening said relay upon expiration of said timer.

18. The method of claim 1 wherein said monitoring step includes monitoring the temperature of said system batteries.

19. The method of claim 18 wherein if a temperature limit is reached electrically disconnecting said conductive leads from said electrical system.

20. The method of claim 18 wherein if a temperature limit is reached electrically disconnecting said conductive leads from said electrical system to reduce the risk of fire.

21. The method of claim 1 wherein if said current through said shunt cable exceeds a first limit within a first period, electrically disconnecting said conductive leads from said electrical system.

22. The method of claim 21 wherein if said current through said shunt cable exceeds a second limit within a second period, electrically disconnecting said conductive leads from said electrical system.

23. The method of claim 1 wherein if said current through said shunt cable geometrically increases over a predetermined period, electrically disconnecting said conductive leads from said electrical system.

24. The method of claim 1 wherein said electrically disconnecting step includes opening a relay.

25. The method of claim 1 wherein said electrically disconnecting step includes recharging said system batteries and said system capacitors for a predetermined time before opening a relay to electrically disconnect said conductive leads from said electrical system.

* * * * *